United States Patent
Spears et al.

(10) Patent No.: US 7,777,369 B2
(45) Date of Patent: Aug. 17, 2010

(54) APPARATUS, SYSTEM AND METHODS FOR ENABLING LINEARITY IMPROVEMENT IN VOLTAGE CONTROLLED VARIABLE CAPACITORS

(75) Inventors: John Hanford Spears, Johnsburg, IL (US); Matthew Russell Greene, Crystal Lake, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 408 days.

(21) Appl. No.: 12/004,864

(22) Filed: Dec. 22, 2007

(65) Prior Publication Data

US 2009/0160263 A1   Jun. 25, 2009

(51) Int. Cl.
*H02M 3/06* (2006.01)
*H03J 3/20* (2006.01)
(52) U.S. Cl. .......................... 307/109; 334/78
(58) Field of Classification Search .................. 307/109; 334/78
See application file for complete search history.

(56) References Cited

U.S. PATENT DOCUMENTS 3,562,637 A   2/1971   Gikow ..................... 323/74
2009/0134960 A1*   5/2009   Larson et al. ................. 334/78

OTHER PUBLICATIONS

K. Buisman, Distortion-Free Varactor Diode Topologies for RF Adaptivity, pp. 157-160.
Robert G. Meyer, Distortion in Variable-Capacitance Diodes, IEEE Journal of Solid-State Circuits, vol. SC-10, No. 1, Feb. 1975, pp. 47-54.

* cited by examiner

*Primary Examiner*—Evan Pert
(74) *Attorney, Agent, or Firm*—Ed Guntin; Guntin Meles & Gust, PLC

(57) ABSTRACT

An embodiment of the present invention provides an apparatus, comprising at least one anti-parallel pair VVC network comprised of two parallel VVCs with one biased in the opposite polarity of the other and at least one anti-series VVC network comprised of two VVCs configured in series, one biased in the opposite polarity of the other such that the resulting AC capacitive variations produce a desired capacitance variation.

18 Claims, 17 Drawing Sheets

US 7,777,369 B2

APPARATUS, SYSTEM AND METHODS FOR ENABLING LINEARITY IMPROVEMENT IN VOLTAGE CONTROLLED VARIABLE CAPACITORS

BACKGROUND

Voltage Variable Capacitors (VVCs) are used effectively in many applications to actively adjust electronic circuits. There are a number of characteristics of VVCs that limit their range of applications. One such limitation is the fact that a VVC may distort AC electrical signals. AC distortion is manifested in the frequency domain by intermodulation products and harmonics. Devices that distort AC signals in this manner are referred to as non-linear devices.

Consequently, there is a long felt need for an invention that may reduce intermodulation products and harmonics and improve the linearity of VVCs; thereby reducing the limitations of their VVC use.

SUMMARY OF THE INVENTION

An embodiment of the present invention provides an apparatus, comprising at least one anti-parallel pair VVC network comprised of two parallel VVCs with one biased in the opposite polarity of the other and at least one anti-series VVC network comprised of two VVCs configured in series, one biased in the opposite polarity of the other such that the resulting AC capacitive variations produce a desired AC capacitance variation.

A further embodiment of the present invention provides a method, comprising: combining at least one anti-parallel pair VVC network comprised of two parallel VVCs with one biased in the opposite polarity of the other with at least one anti-series VVC network comprised of two VVCs configured in series with one biased in the opposite polarity of the other, such that the resulting AC capacitive variations produce a desired capacitance variation.

Still another embodiment of the present invention, provides an apparatus, comprising at least one anti-parallel pair VVC network including at least four capacitors and wherein at least two of the capacitors are voltage variable capacitors (VVCs) and the remaining capacitors are larger than the first two and are comprised of either fixed capacitors or VVCs and at least one anti-series VVC network comprised of two VVCs configured in series, one biased in the opposite polarity of the other and coupled in series with said at least one anti-parallel pair VVC network such that the resulting AC capacitive variations nearly cancel in shape and magnitude.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" may be used to indicate that two or more elements are in either direct or indirect (with other intervening elements between them) physical or electrical contact with each other, and/or that the two or more elements co-operate or interact with each other (e.g. as in a cause an effect relationship).

Embodiments of the present invention significantly reduce the non-linearity of a VVC by adding a compensation network to N series VVCs. Various embodiments of compensated VVC circuit topologies may be designed to make the net capacitance of the VVC network more nearly constant with respect to AC voltages without significantly reducing the range of capacitance controlled by the bias control voltage. Various embodiments of compensated VVC circuit topologies may be designed to make the net capacitance of the VVC network vary intentionally in a desired way with respect to AC voltages without significantly reducing the range of capacitance controlled by the bias control voltage. DC bias voltages are applied to the VVCs through a high AC impedance feed (e.g. transmission line, large resistor, inductor, RF choke . . . ). The high AC impedance feeds are not shown in the figures.

Figure 1:
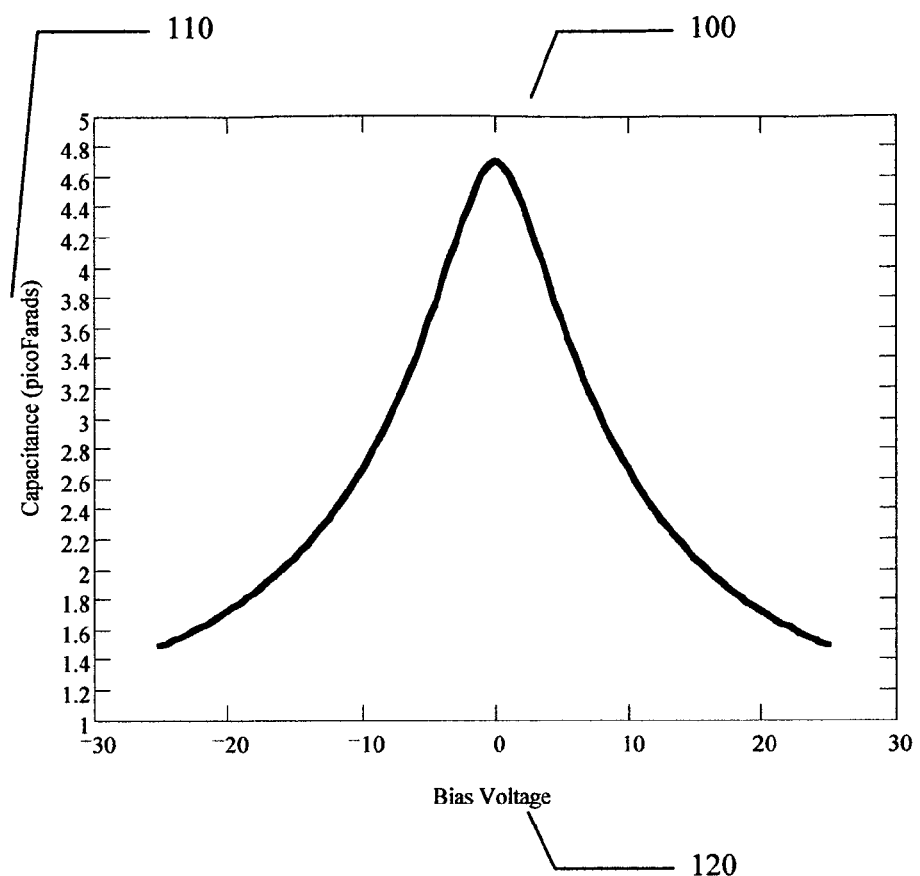
FIG. 1 illustrates an example Capacitance vs. Voltage relationship for a VVC, tunable dielectric based VVC.

VVCs are made using a number of different technologies, and include: semiconductor varactors, MEMS varactors, ferroelectric thin film capacitors operating in their paraelectric phase, or any other technology that implements a variable capacitance biased with an analog control voltage. In most cases, non-linearities have prevented these VVCs from being used in highly linear applications. An example capacitance 110 vs. voltage 120 curve, C(Vbias), is shown generally as 100 of FIG. 1.

Figure 2:
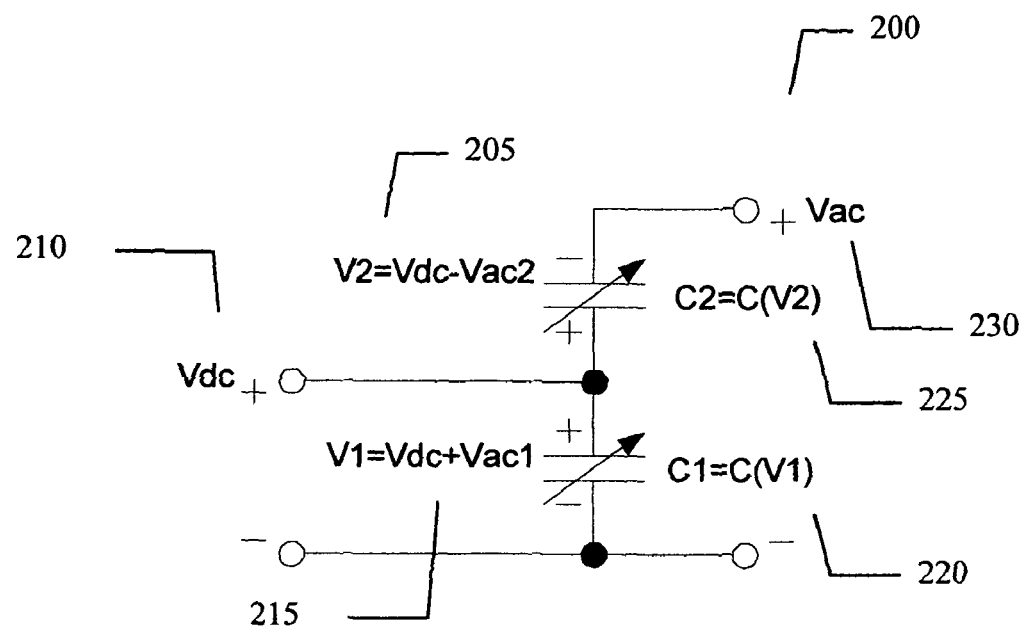
FIG. 2 (Prior Art) provides two VVCs in an anti-series configuration.
Figure 3:
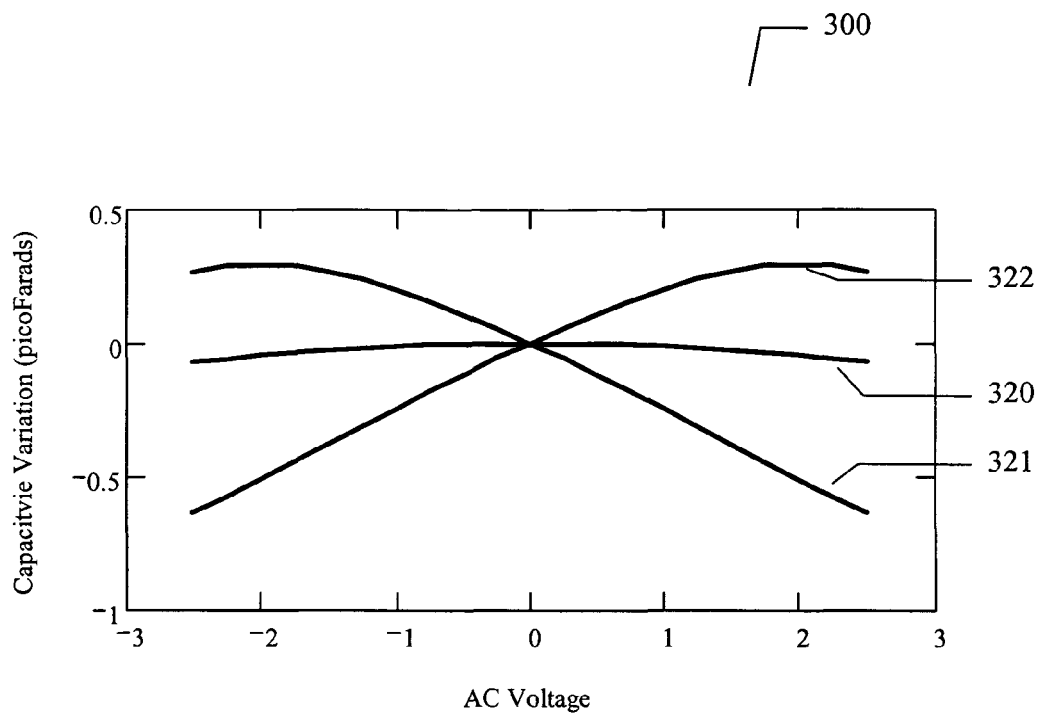
FIG. 3 depicts calculated capacitive variations of an anti-series pair of VVCs vs. AC voltage, using voltage tunable dielectric based VVC biased at 2 Volts.
Figure 4:
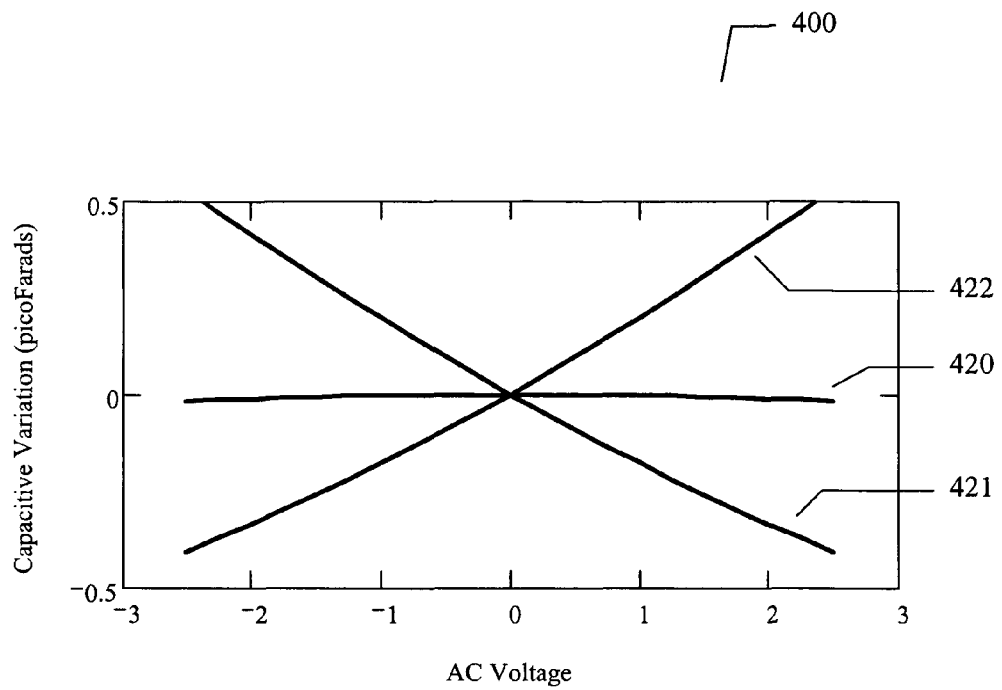
FIG. 4 depicts calculated capacitive variations of an anti-series pair of VVCs vs. AC voltage, using voltage tunable dielectric based VVC biased at 8 Volts.
Figure 5:
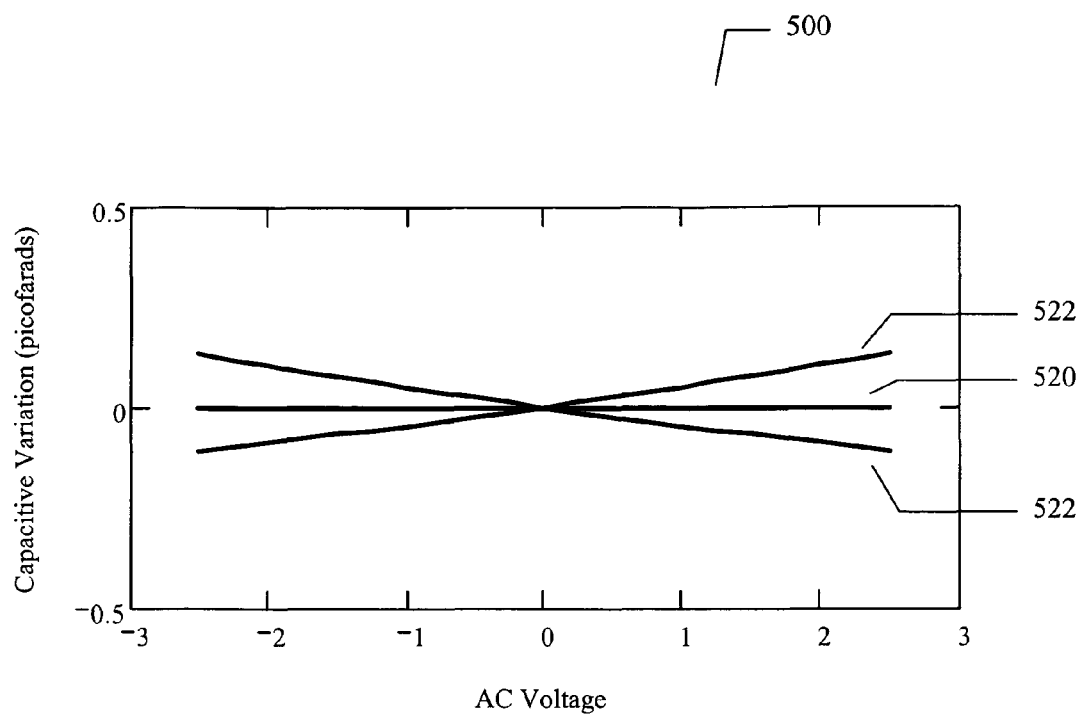
FIG. 5 depicts calculated capacitive variations of an anti-series pair of VVCs vs. AC voltage, using voltage tunable dielectric based VVC biased at 22 Volts.

A prior art circuit topology commonly used to improve linearity with VVCs is two VVCs 220 and 225 connected in series and biased in opposite polarity by Vdc 210 at V2 205 and V1 215 shown generally as 200 of FIG. 2. In this example, the individual capacitance C1(V1) is plotted as curves 321, 421, and 521 in FIGS. 3, 4, and 5 for the cases of bias voltage Vdc=2, 8, and 22 volts respectively. Furthermore, the individual capacitance C2(V2) is plotted as curves 322, 422, and 522 in FIGS. 3, 4, and 5 for the cases of bias voltage Vdc=2, 8, and 22 volts respectively. Vac is the AC voltage applied across both capacitances C1 and C2 in series, and it is illustrated at 230. With this anti-series topology, the net capacitive variations with respect to an AC voltage (Vac) are substantially reduced as seen in curves 320, 420, and 520 in FIG. 3 at 300, FIG. 4 at 400 and FIG. 5 at 500 as capacitance variation vs. voltage. Note that the resulting capacitance variations resemble concave-down parabolas. The symmetry of the resulting capacitance variations about an AC voltage of zero significantly reduces the even order distortions of the AC voltage to the extent that two capacitors values can be matched. In practice, even order distortions seen in an anti-series topologies are due to: 1) parasitic elements that are inherently asymmetric, 2) Hysteresis in the material, and/or 3) Asymmetries due to process variations, for example: uneven etching, variability in plate distance, permittivity variations, etc.

Figure 6:
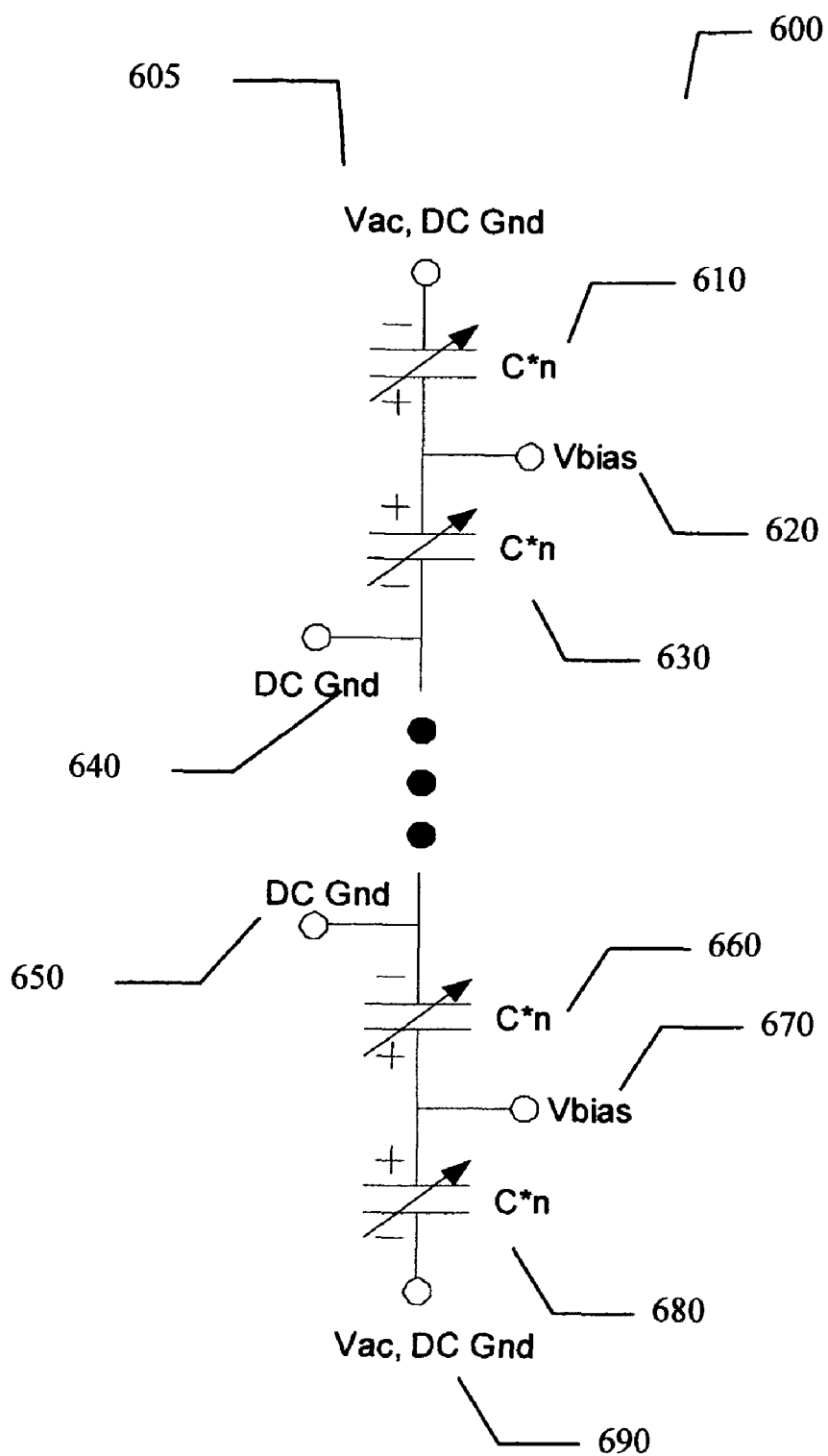
FIG. 6 (Prior Art) depicts concatenated anti-series configuration of VVCs where n capacitors are placed in series. n is denoted as the stack number.

Further linearity improvement is accomplished by concatenating anti-series pairs of VCCs as shown in the prior art circuit at 600 of FIG. 6. The shape of the capacitive variations due to an AC voltage is an even function, symmetric around the y axis. Vac, DC Ground is depicted 605; C*n 610, 630, 660 and 680; DC ground 640 and 650; Vbias 620 and 670 and Vac, DC ground 690.

Figure 7:
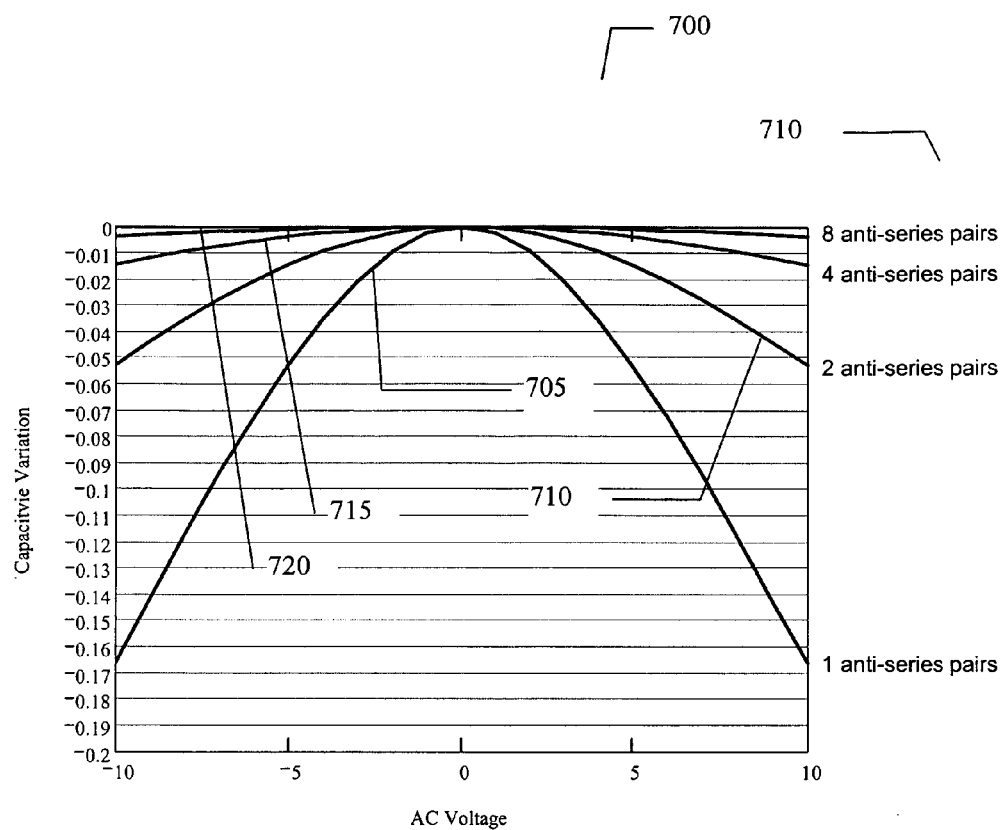
FIG. 7 depicts calculated capacitive variation vs. AC voltage for 2, 4, 8 and 16 series stacked VVCs as shown in FIG. 6.

An example of the capacitive variations resulting from n anti-series capacitors with respect to an AC voltage is shown at 700 of FIG. 7. Note that the resulting capacitance variations 705 (1 anti-series pair) resemble a concave-down parabola. As N increases, the parabola becomes more shallow 710 (2 anti-series pairs), 715 (4 anti-series pairs) and 720 (8 anti-series pairs) and the capacitive variations are reduced. It follows that as the number n is increased, the linearity improves (both the even and odd order distortions) because the AC voltage impressed across any given pair of VVCs is reduced. However, increasing N dramatically increases the total capacitance required in the series stack to N²C. At some point, the total capacitance becomes prohibitive either due to cost or due to compromised electrical performance in other important characteristics of the capacitor (e.g. charging time, parasitic inductance, Q, reliability, leakage current, or cost).

Figure 8:
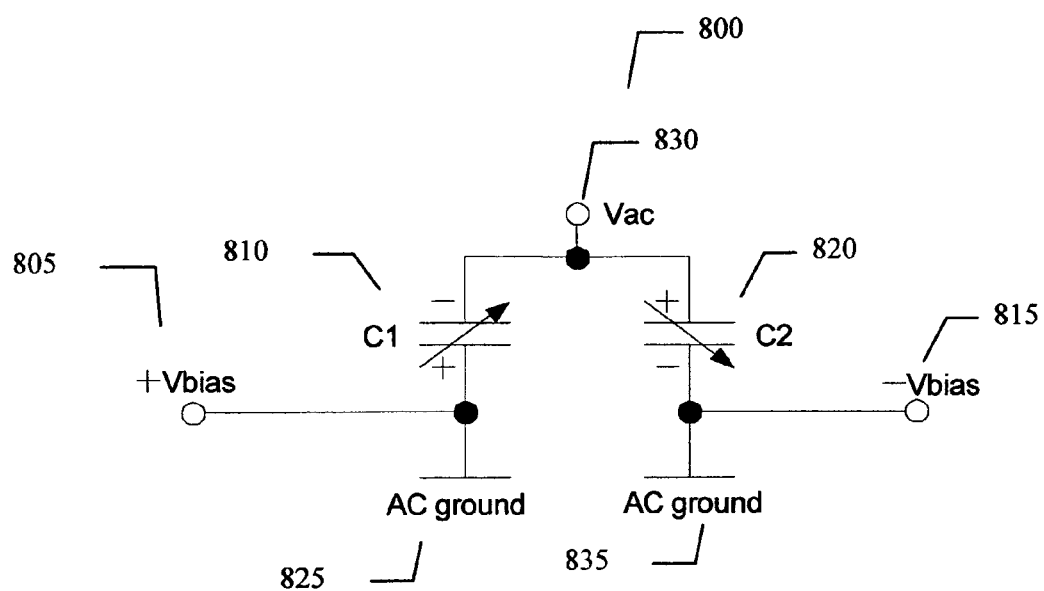
FIG. 8 shows an anti-parallel VVC topology: two VVCs connected in parallel and biased in opposite polarity.

Another less commonly used topology to improve linearity with VVCs as shown in FIG. 8 at 800 is two VVCs 810 and 820 connected in parallel and biased in opposite polarity by Vdc 805 and 815. This provides an anti-parallel compensation network. Vac is shown at 830 and AC ground at 825 and 835.

Figure 9:
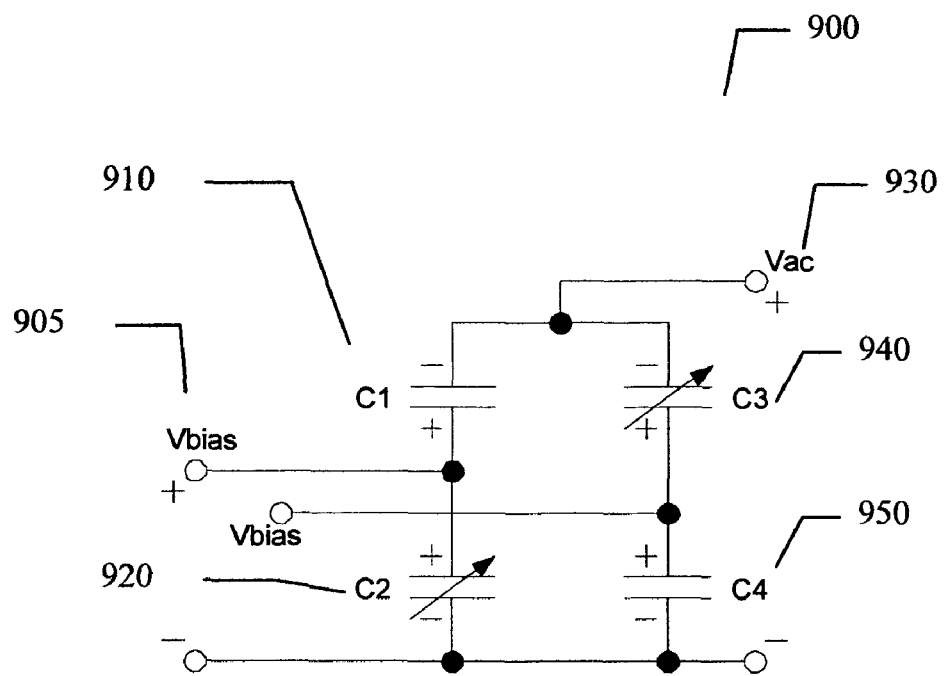
FIG. 9 shows an anti-parallel network of VVCs comprised of four capacitors, where two of the four capacitors are VVCs and two capacitors are fixed according to an embodiment of the present invention.
Figure 10:
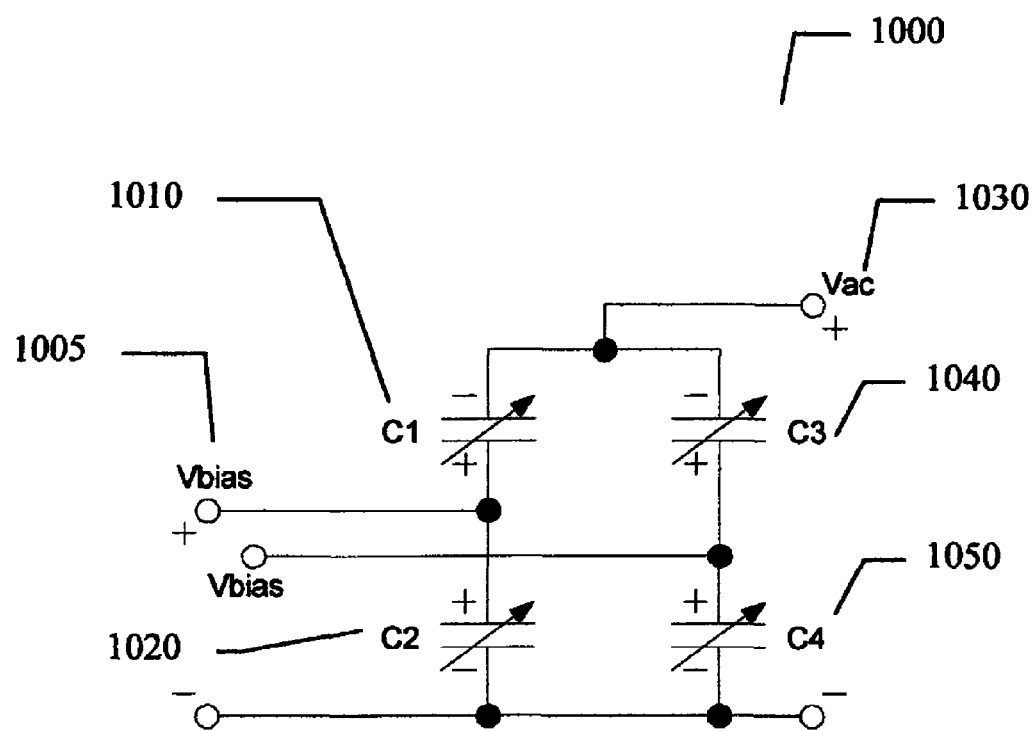
FIG. 10 shows an anti-parallel network of VVCs comprised of four capacitors, where all four capacitors are VVCs according to an embodiment of the present invention.

Alternate circuit topologies that can also accomplish improvements in linearity are shown at 900 of FIG. 9 and 1000 of FIG. 10. For these alternate topologies, each branch contains two series capacitors with an opposite polarity of bias control voltage. We will denote each of these networks as an anti-parallel pair of VVCs. A minimum of four capacitors are required for this compensation network—although the present invention is not limited in this respect. In FIG. 9 these capacitors are denoted as 910 and 920 for one branch, and 940 and 950 for the second parallel branch. In FIG. 10 these capacitors are denoted as 1010 and 1020 for one branch, and 1040 and 1050 for the second parallel branch. Two of the capacitors (C2 920, 1020 and C3 940, 1040) are VVCs. The other capacitors (C1 910, 1010 and C4 950, 1050) may be either fixed capacitors or VVCs. Typically C1 (910 or 1010) and C4 (950 or 1050) would be larger than C2 (920 or 1020) and C3 (940 or 1040) to maximize tune range. Vbias is illustrated at 905, 1005 and Vac is shown at 930, 1030.

In one embodiment of FIG. 9 or FIG. 10, the values of C1 and C4 are essentially equal. Furthermore, the values of C2 and C3 are essentially equal. In another embodiment, only C1 and C4 are VVCs with C2 and C3 being fixed capacitors. In yet another embodiment, only C2 and C3 are VVCs with C1 and C4 being fixed capacitors.

Figure 11:
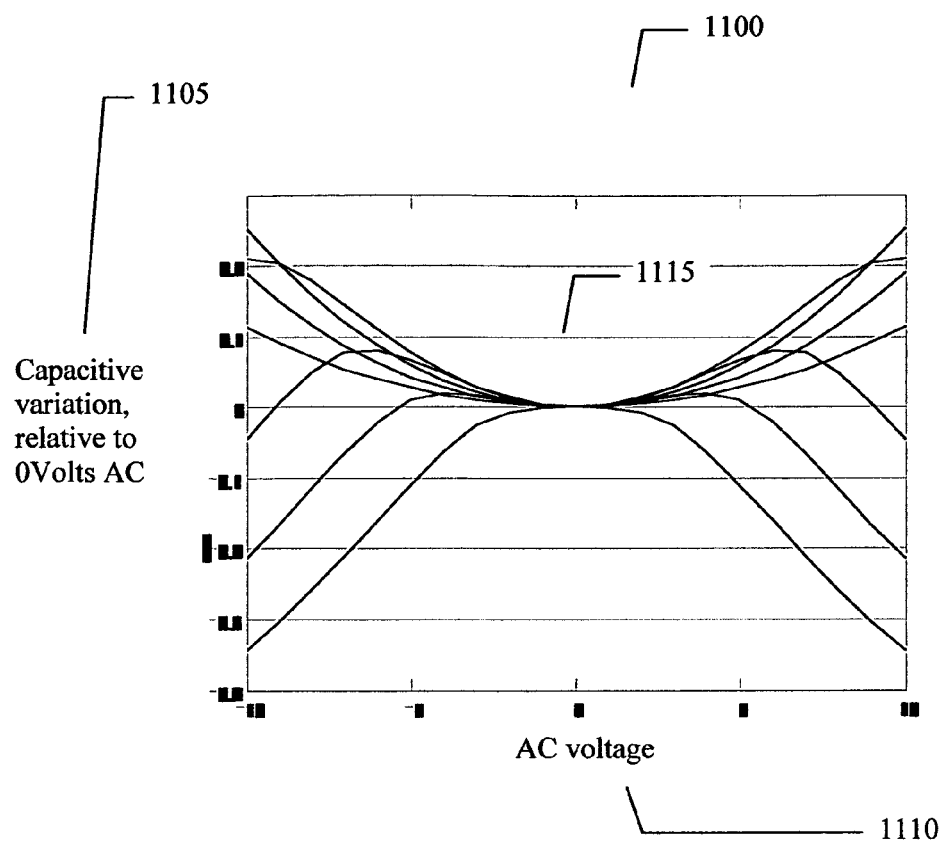
FIG. 11 shows capacitive variation vs. AC voltage for various bias voltages of an anti-parallel VVC topology as shown in FIGS. 8, 9 and 10.

An example of the resulting capacitive variation of this network of FIG. 9 or 10 is shown at 1100 of FIG. 11 in capacitive variation 1105 vs. AC voltage 1110. Note that the capacitive variations are again an even function of AC voltage. Some variations appear to be parabolic 1115, some are higher order functions. Note that the capacitance variations are concave-up for the anti-parallel pair circuit topologies of FIGS. 9 and 10.

Figure 12:
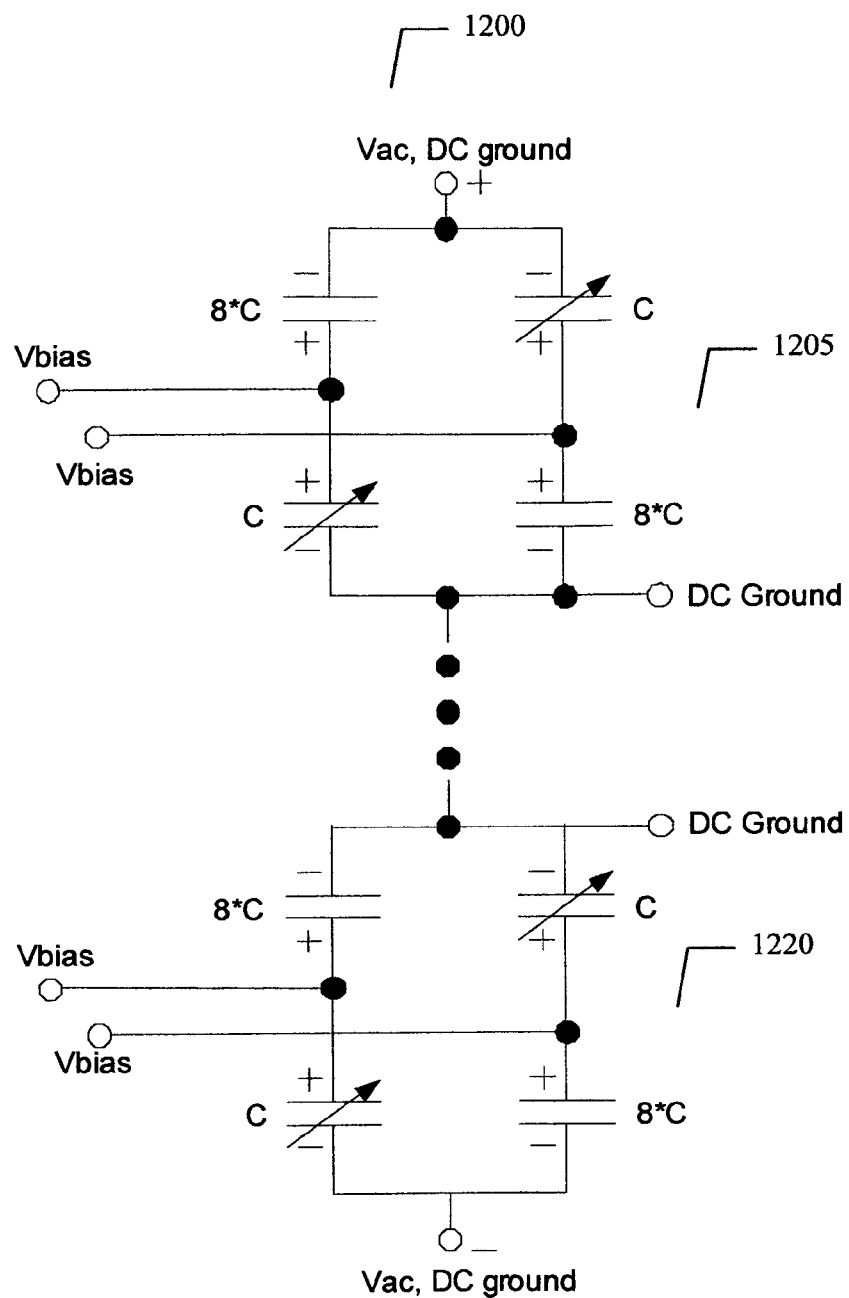
FIG. 12 schematically illustrates a concatenated anti-parallel configuration of VVCs of an embodiment of the present invention, where N anti-parallel configurations are placed in series and N is denoted as the stack number.

Further improvements in capacitive variations can be accomplished by concatenating anti-parallel VVC networks as shown in FIG. 12 at 1200. Concatenating anti-parallel VVCs 1205 and 1220 will further improve linearity over a single anti-parallel circuit in the same manner as the anti-series concatenation, through voltage division of the applied AC signal.

Both the anti-series and the anti-parallel pair circuit topologies, have a capacitive variation with respect to AC voltages that resembles a parabola. This invention combines anti-series and anti-parallel pair topologies in the same network to significantly reduce the total capacitive variation of the tunable capacitive network. The anti-series and anti-parallel pair circuit topologies may be chosen to cancel each others capacitive variations in both shape and magnitude.

There are applications in which a non-zero capacitive variation is desired to either cancel capacitive variations in other components or to create a particular distortion in a signal. Anti-series and anti-parallel pair networks can be combined with non-paired VVCs to give a desired capacitive variation of the form:

$$C(V_{AC}) = C_0 + C_1 \cdot V_{AC} + C_2 \cdot V_{AC}^2 \tag{1}$$

Figure 13:
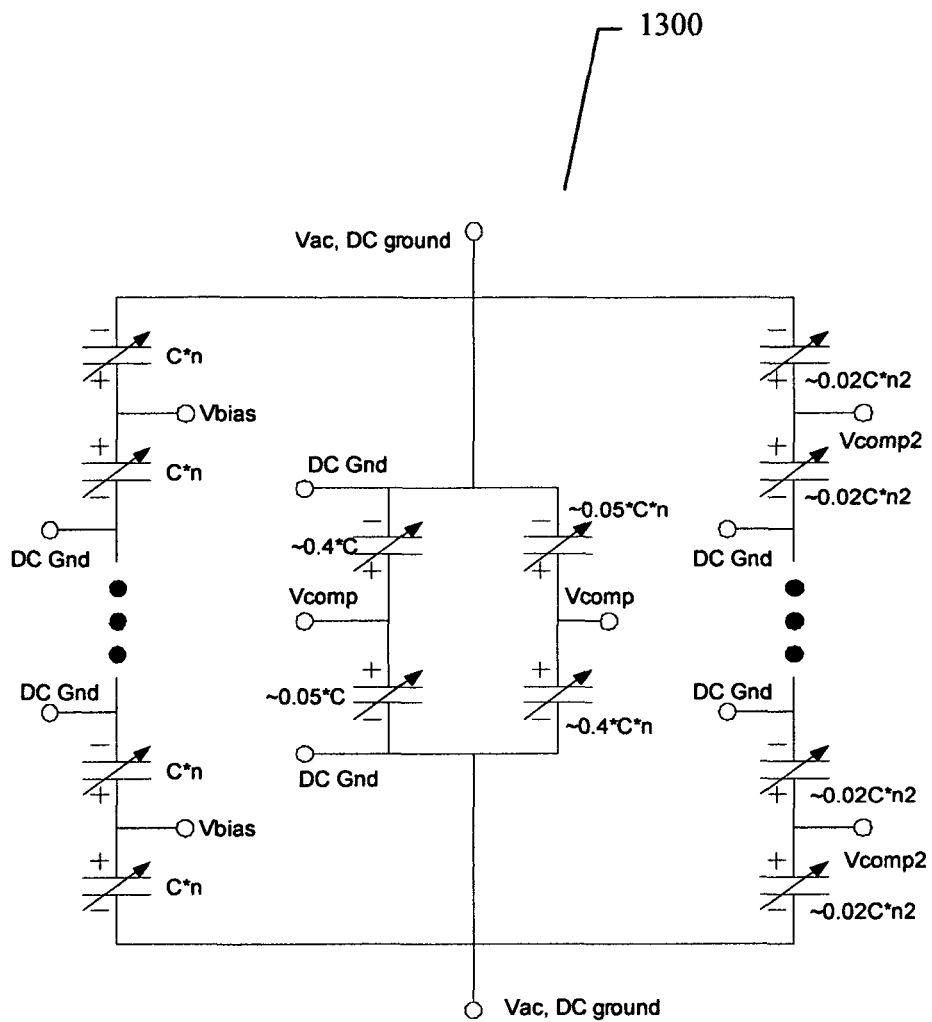
FIGS. 13-16 show different circuit topologies that will accomplish various levels of improvements in linearity of several embodiments of the present invention.
Figure 14:
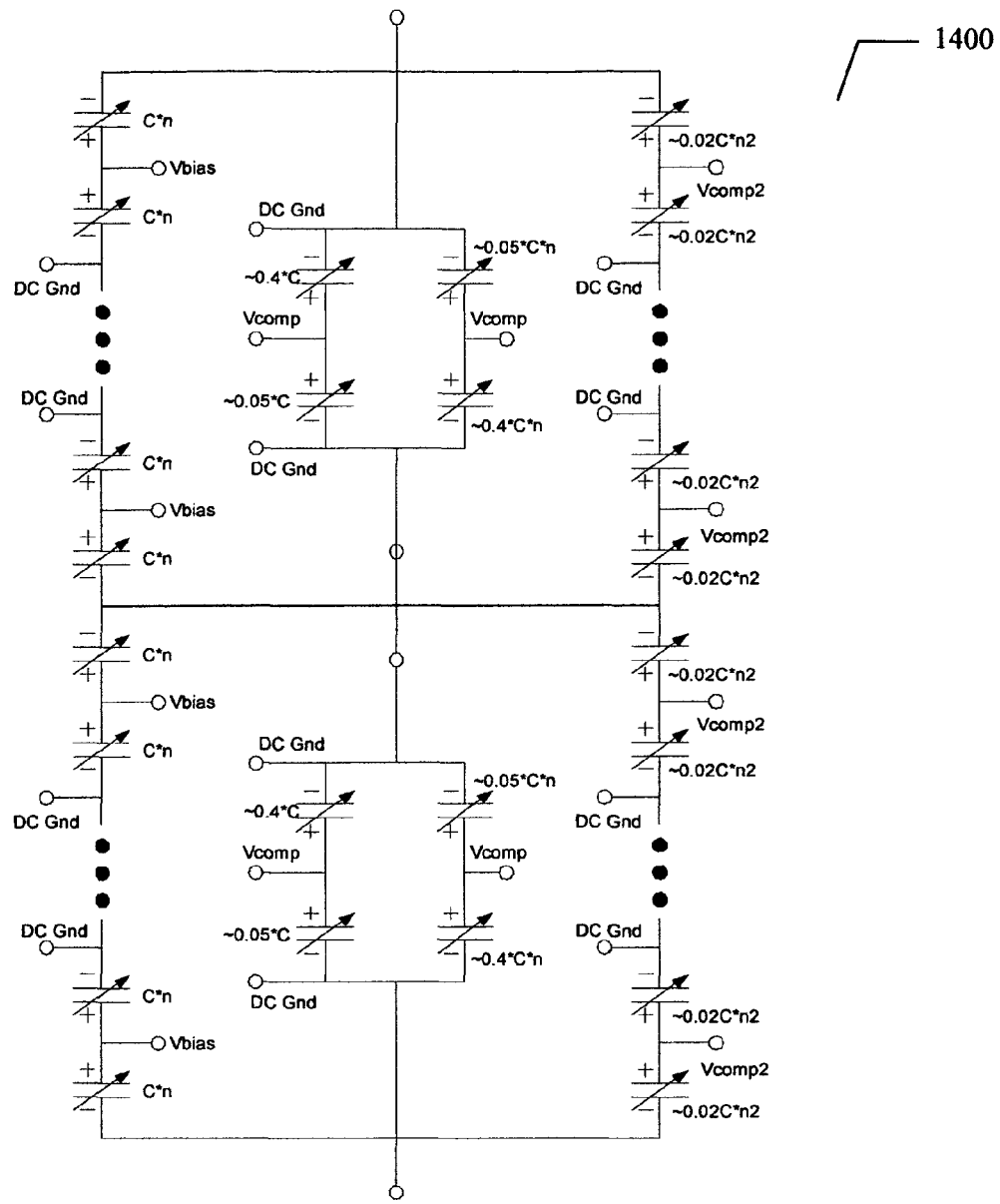
Figure 15:
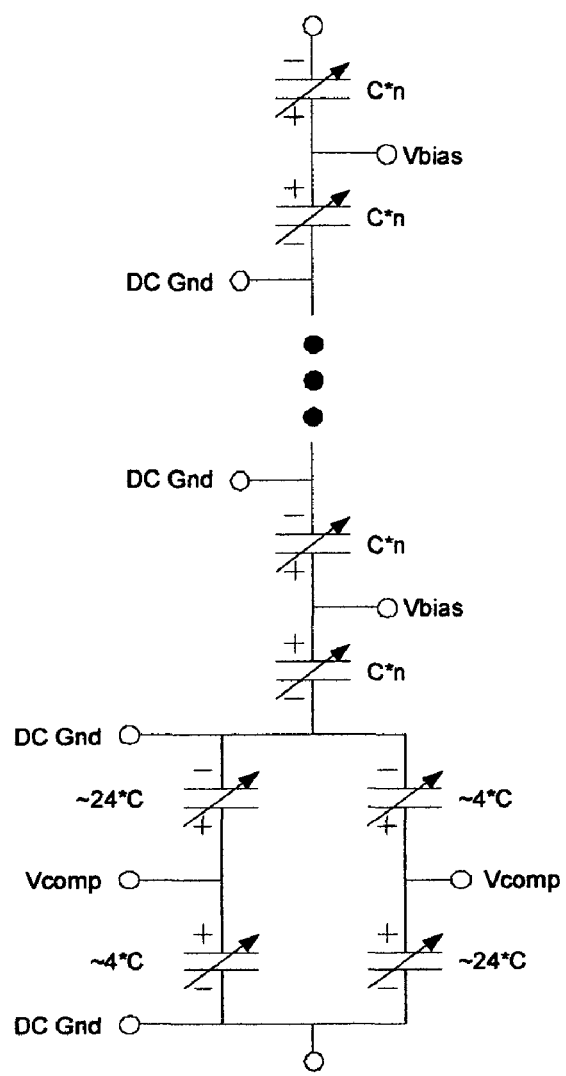
Figure 16:
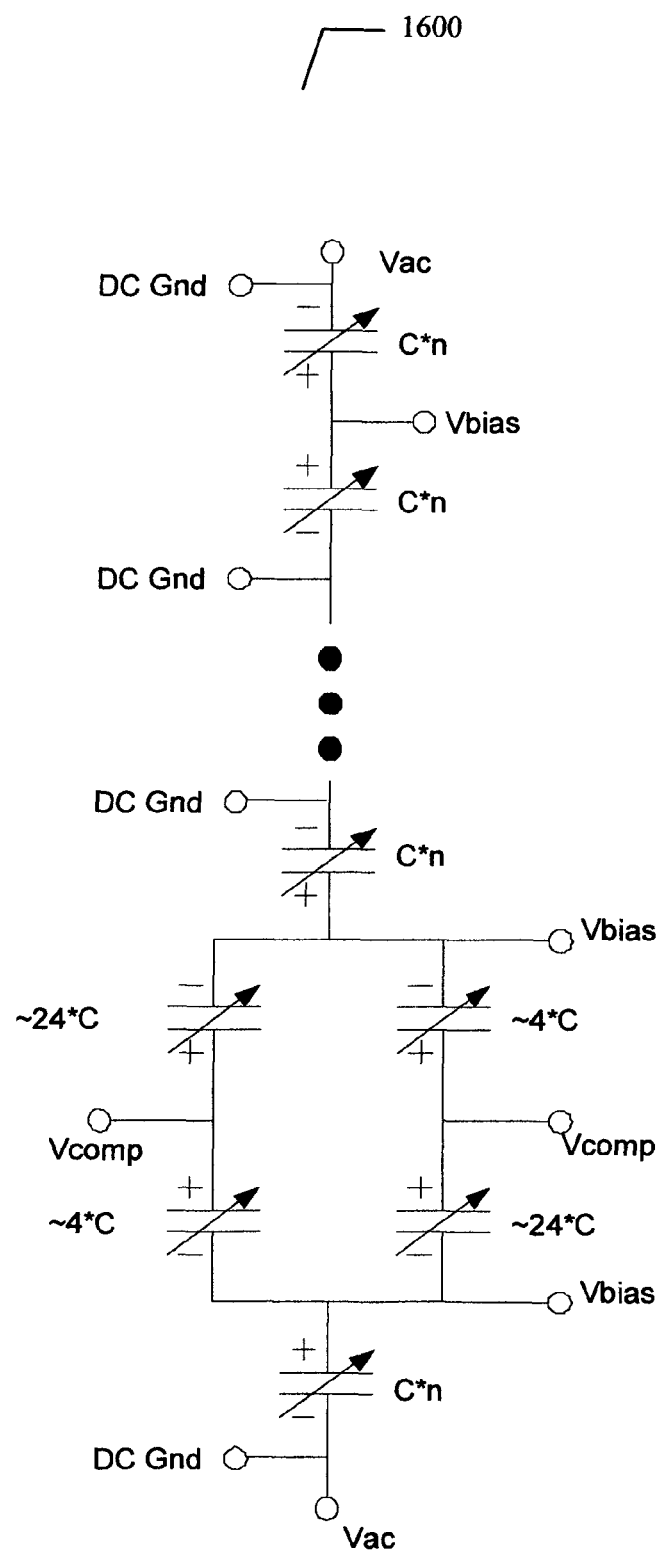

FIGS. 13-16 show different circuit topologies that will accomplish various levels of improvements in linearity. The capacitive ratios in the circuits are illustrative only and may vary by orders of magnitude depending on the application. In FIG. 13 at 1300, the anti-parallel pair and anti-series configurations are combined in parallel with an additional anti-series stack to extend cancellation for cases with less capacitive variation. This could be biased with three separate bias voltages or with two bias voltages and a third bias that is the difference between the two. FIG. 14 at 1400 shows two of the topologies from FIG. 13 concatenated. FIG. 15 at 1500 shows the preferred embodiment which is an anti-parallel pair and multiple anti-series pairs combined in series. This configuration maintains compensation with much larger AC voltage than the previous configurations because the applied AC voltage is divided across many capacitors in series. FIG. 16 at 1600 shows a series combination with another bias configuration. Note that in the embodiment shown in FIG. 16, the compensation voltage $V_{comp}$ is a constant value. In many embodiments that employ anti-series and anti-parallel circuit topologies, setting the Vcomp voltage to a fixed value while the Vbias voltage is allowed to vary for tuning is sufficient to realize improvements in the linearity performance of the capacitive network relative to using the anti-series circuit topology alone.

Mathematical Analysis:

The capacitance of a VVC can be written in a power series expansion as $$C(v_a, v_b) = K_0(v_b) + K_1(v_b) \cdot v_a + K_2(v_b) \cdot v_a^2 + \ldots \quad (2)$$

Where $v_b$ is the bias voltage of the VVC. $v_a$ is the incremental AC voltage applied to the VVC. $K_0(v_b)$, $K_1(v_b)$ and $K_2(v_b)$ are power series coefficients for the VVC as a function of $v_b$. Reference 1 documents the capacitance of the anti-series configuration (FIG. 2) as $$C_s(v_a, v_b) = \frac{K_0(v_b)}{2} + \frac{K_2(v_b)}{8} \cdot \left(1 - \frac{1.5 \cdot K_1(v_b)}{K_0(v_b) \cdot K_2(v_b)}\right) \cdot v_a^2 + \ldots \quad (3)$$

Note that the linear product which causes second order distortion is not present. In theory, this configuration will not cause second order distortion. In practice, parasitic effects will limit the full cancellation of second order distortions. Note also that there is a set of coefficients that can eliminate the squared term which causes third order distortion. If it is possible to build a VVC network with a $C(v_a, v_b)$ characteristic that complies with $$1.5 \cdot K_1(v_b) = K_0(v_b) \cdot K_2(v_b), \quad (4)$$

then all third order distortions can be theoretically eliminated for the anti-series configuration. Achieving complete cancellation is generally not possible because VVC capacitance variations, or C-V curve, are often predetermined by device physics which precludes compliance with equation (4).

Reference 1 also documents the capacitance of the anti-parallel configuration (special case of FIG. 8 with C1=C2) as $$C_p(v_a, v_c) = 2 \cdot K_0(v_c) + 2 \cdot K_2(v_c) \cdot v_a^2 + \quad (5)$$

Where $v_c$ is the bias voltage for the anti-parallel VVCs. For the anti-parallel configuration, the linear term is also not present. The squared term is only zero if the $K_2(v_c)$ coefficient is zero. For the preferred embodiment of this invention (FIG. 15), the capacitance, $C(v_a, v_b, v_c)$, is derived as follows. The series combination of $C_s$ and $C_p$ is given by $$C_{eq}(v_a, v_b, v_c) = \left(\frac{N}{C_s(v_a, v_b)} + \frac{1}{F \cdot C_p(v_a, v_c)}\right)^{-1} \quad (6)$$

Where F is a scaling factor to allow the values of the parallel and series configurations to be adjusted, N is the number of series pairs. Substituting equations 3 and 5 into equation 6 and solving for the capacitive variation gives:

$$C(v_a, v_b, v_c) = \frac{1}{\frac{2 \cdot N}{K_0(v_b)} + \frac{1}{2 \cdot F \cdot K_0(v_c)}} + \frac{3}{\left(\frac{2 \cdot N}{K_0(v_b)} + \frac{1}{2 \cdot F \cdot K_0(v_c)}\right)^4} \cdot \left[\frac{2 \cdot N \cdot K_2(v_b)}{3 \cdot K_0(v_b)^4} \cdot \left(1 - \frac{1.5 \cdot K_1(v_b)^2}{K_0(v_b) \cdot K_2(v_b)}\right) + \quad (7)$$

-continued $$\left. \frac{K_2(v_c)}{24 \cdot F^3 \cdot K_0(v_c)^4} \right] \cdot v_a^2 \ldots$$

Equation 7 provides a means to vary the $v^2$ term independent of the linear term. Note the criteria for eliminating the squared term is $$0 = \frac{2 \cdot N \cdot K_2(v_b)}{3 \cdot K_0(v_b)^4} \cdot \left(1 - \frac{1.5 \cdot K_1(v_b)^2}{K_0(v_b) \cdot K_2(v_b)}\right) + \frac{K_2(v_c)}{24 \cdot F^3 \cdot K_0(v_c)^4} \quad (8)$$

The flexibility of choosing N, F and independently controlling the bias voltages makes elimination of the squared term achievable without resorting to changing the physics of the VVC.

Such a network can also be combined with a non-paired VVC mathematically described in Eqn. (2) to create AC capacitive variations of the form of equation (1):

$$C(V_{AC}) = C_0 + C_1 \cdot V_{AC} + C_2 \cdot V_{AC} \quad (1)$$

Where $C_0$, $C_1$ and $C_2$ are now given by:

$$C_0 = \frac{1}{\frac{2 \cdot N}{K_0(v_b)} + \frac{1}{2 \cdot F \cdot K_0(v_c)}} + F2 \cdot K_0(v_b) \quad (9)$$

$$C_1 = F2 \cdot K_1(v_b) \quad (10)$$

$$C_2 = F2 \cdot K_2(v_b) + \frac{3}{\left(\frac{2 \cdot N}{K_0(v_b)} + \frac{1}{2 \cdot F \cdot K_0(v_c)}\right)^4} \cdot \left[\frac{2 \cdot N \cdot K_2(v_b)}{3 \cdot K_0(v_b)^4} \cdot \left(1 - \frac{1.5 \cdot K_1(v_b)^2}{K_0(v_b) \cdot K_2(v_b)}\right) + \frac{K_2(v_c)}{24 \cdot F^3 \cdot K_0(v_c)^4}\right] \quad (11)$$

Where, F2 is the scaling factor to allow the non-paired VVC to be a different value than the other capacitors. It is apparent in the equations that C1 would be determined by the non-paired VVC, while C0 and C2 would be determined by the combination of all components. The flexibility of choosing N, F, F2 and independently controlling the bias voltages allows the linear and squared terms to be designed to a desired value without resorting to changing the physics of the VVC.

Figure 17:
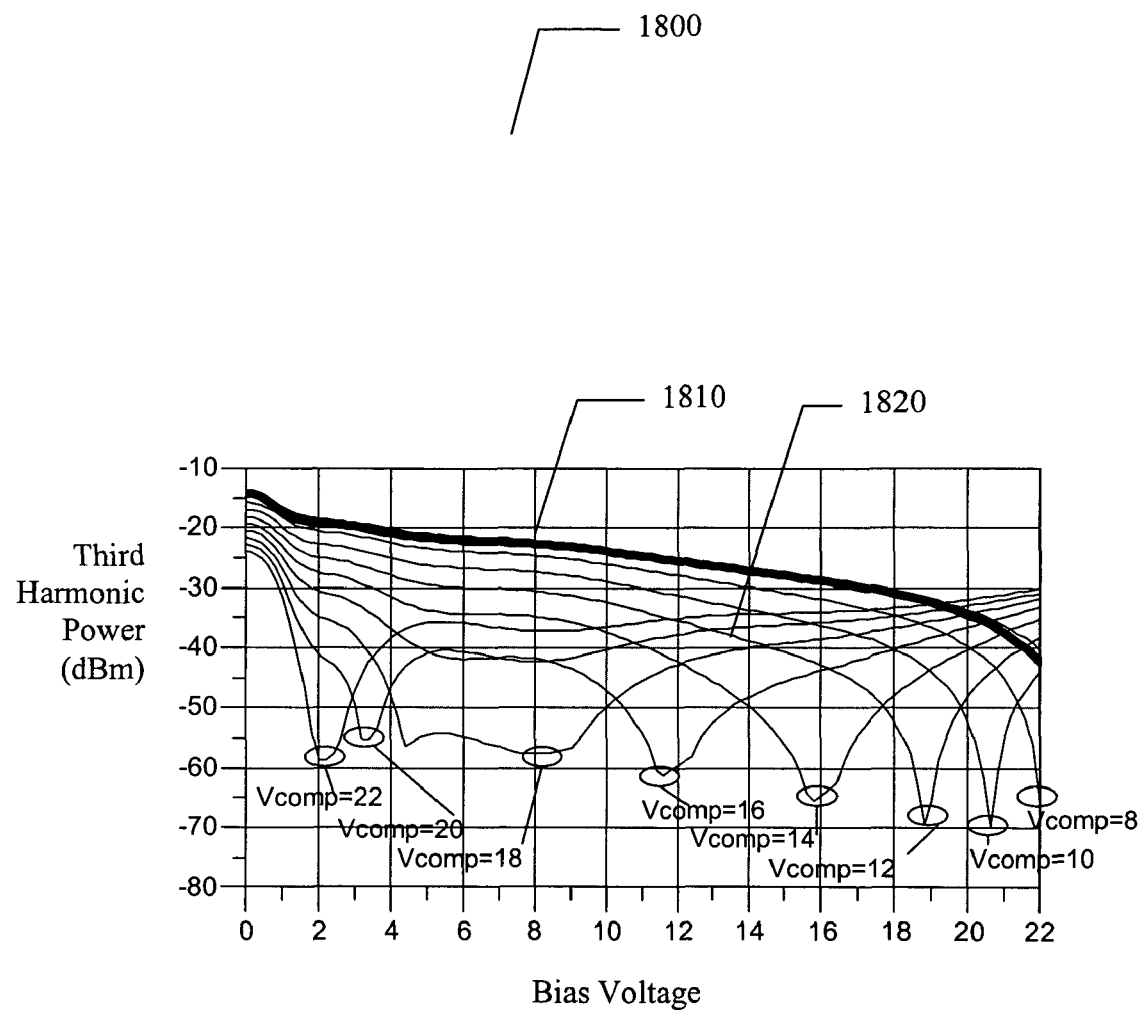
FIG. 17 provides 3rd harmonic performance for a VVC network configured as shown in FIG. 15.

Simulation Analysis:

FIG. 17 at 1700 shows simulated third harmonic performance as a function of bias voltage of the series configuration (FIG. 16) for various compensation voltages. 3rd harmonic performance improves up to 35 dB. Tolerance analysis (not included in the present disclosure) using reasonable process variations indicates 20 dB improvement in the third harmonic could be realized in a low cost non-custom manufacturing process. Thus, embodiments of the present invention are capable of accomplishing substantial linearity improvements in VVCs with the above described compensation circuit. It is understood that embodiments of the invention apply to VVCs from multiple technologies.

While the present invention has been described in terms of what are at present believed to be its preferred embodiments, those skilled in the art will recognize that various modifications to the disclose embodiments can be made without departing from the scope of the invention as defined by the following claims.

What is claimed is:

1. An apparatus, comprising:
at least one anti-parallel pair VVC network comprised of two parallel VVCs with one biased in the opposite polarity of the other; and
at least one anti-series VVC network comprised of two VVCs configured in series, one biased in the opposite polarity of the other and coupled with said at least one anti-parallel pair VVC network such that the AC capacitive variations from said at least one VVC anti-parallel pair VVC network and said at least one VVC anti-series network produce a desired capacitance variation.

2. The apparatus of claim 1, wherein said at least one anti-parallel pair VVC network and said anti-series VVC network are coupled in parallel.

3. The apparatus of claim 1, wherein said anti-parallel pair VVC network and said anti-series VVC network are coupled in series.

4. The apparatus of claim 1, wherein said anti-parallel pair VVC network and said anti-series VVC network are coupled in both parallel and series.

5. The apparatus of claim 1, wherein said at least one anti-parallel pair VVC network is accomplished by combining a minimum of four capacitors and wherein at least two of said minimum of four capacitors are voltage variable capacitors (VVCs) and the remaining capacitors are much larger than the first two and are comprised of either fixed capacitors or VVCs.

6. The apparatus of claim 1, further comprising at least one non-paired VVC coupled to said at least one anti-parallel pair VVC network.

7. An apparatus comprising:
a plurality of anti-parallel pair VVC networks coupled in series, each comprised of two parallel VVCs with one biased in the opposite polarity of the other.

8. The apparatus of claim 7, wherein at least one of said plurality of anti-parallel pair networks is accomplished by combining a minimum of four capacitors with at least two of said capacitors being voltage variable capacitors (VVCs) and the remaining capacitors being much larger than said first two and comprised of either fixed capacitors or VVCs.

9. A method, comprising:
combining at least one anti-parallel pair VVC network including at least two parallel VVCs with at least one biased in the opposite polarity of at least one other, with at least one anti-series VVC network comprised of two VVCs configured in series with one biased in the opposite polarity of the other, such that the AC capacitive variations from said at least one VVC anti-parallel compensation network and said at least one VVC anti-series compensation network produce a desired capacitance variation.

10. The method of claim 9, further comprising coupling said anti-parallel pair networks and anti-series networks in parallel.

11. The method of claim 9, further comprising coupling said anti-parallel pair networks and anti-series networks in series.

12. The method of claim 9, further comprising coupling said anti-parallel pair networks and anti-series networks in both parallel and series.

13. The method of claim 9, wherein said at least one anti-parallel pair network is accomplished by combining a minimum of four capacitors and wherein at least two of said capacitors are voltage variable capacitors (VVCs) and the remaining capacitors are much larger than the first two and are comprised of either fixed capacitors or VVCs.

14. The method of claim 9, further comprising coupling at least one non-paired VVC to said at least one anti-parallel pair VVC network.

15. A method of enabling linearity improvement in voltage controlled variable capacitors (VVCs) comprising:
using a plurality of anti-parallel pair VVCs networks, each comprised of two parallel VVCs with one biased in the opposite polarity of the other and combined in series.

16. The method of claim 15, wherein at least one of said plurality of anti-parallel pair network is accomplished by combining a minimum of four capacitors with at least two of said capacitors being voltage variable capacitors (VVCs) and the remaining capacitors being much larger than said first two and comprised of either fixed capacitors or VVCs.

17. An apparatus, comprising:
at least one anti-parallel pair VVC network with a first bias voltage and including at least four capacitors and wherein at least two of said capacitors are voltage variable capacitors (VVCs) and the remaining capacitors are larger than the first two and are comprised of either fixed capacitors or VVCs; and
at least one anti-series VVC network with a second bias voltage and comprised of two VVCs configured in series, one biased in the opposite polarity of the other and coupled in series with said at least one anti-parallel pair VVC network such that the AC capacitive variations from said at least one VVC anti-parallel pair compensation network and said at least one VVC anti-series compensation network more nearly cancel in shape and magnitude.

18. The apparatus of claim 17, wherein at least one of said VVCs are voltage tunable dielectric capacitors.

* * * * *

UNITED STATES PATENT AND TRADEMARK OFFICE
CERTIFICATE OF CORRECTION

PATENT NO. : 7,777,369 B2
APPLICATION NO. : 12/004864
DATED : August 17, 2010
INVENTOR(S) : John Hanford Spears and Matthew Russell Greene It is certified that error appears in the above-identified patent and that said Letters Patent is hereby corrected as shown below:

On the Title Page, Item (73), the Assignee name "AT&T INTELLECTUAL PROPERTY I, L.P., Reno, NV (US)" should read --PARATEK MICROWAVE, INC., NASHUA, NH (US)--.

Signed and Sealed this
Twenty-first Day of June, 2011

David J. Kappos
*Director of the United States Patent and Trademark Office*